United States Patent [19]

Tatsuoka

[11] Patent Number: 5,765,655
[45] Date of Patent: Jun. 16, 1998

[54] COMBINATIONAL WEIGHING MACHINE WITH A DISCHARGE CHUTE HAVING ARTICLE GUIDING SURFACE

[75] Inventor: Masahiko Tatsuoka, Shiga, Japan

[73] Assignee: Ishida Co., Ltd., Kyoto, Japan

[21] Appl. No.: 588,012

[22] Filed: Jan. 17, 1996

[30] Foreign Application Priority Data

Jan. 19, 1995  [JP]  Japan .................................. 7-025863

[51] Int. Cl.$^6$ .................................................. G01G 13/00
[52] U.S. Cl. .................... 177/25.18; 177/59; 177/98; 177/105; 222/547; 193/2 R
[58] Field of Search ........................ 177/25.18, 59, 177/98, 105; 222/547, 564; 198/568; 193/2 R

[56] References Cited

U.S. PATENT DOCUMENTS

| | | | |
|---|---|---|---|
| Re. 32,276 | 11/1986 | Kakita et al. | 177/25.18 |
| 4,040,530 | 8/1977 | Mahr et al. | 193/2 R X |
| 4,398,614 | 8/1983 | Kakita et al. | 177/25.18 |
| 4,444,283 | 4/1984 | Mikami | 177/59 |
| 4,478,300 | 10/1984 | Mikami | 177/59 |
| 4,548,342 | 10/1985 | Fisher | 222/564 X |
| 4,570,727 | 2/1986 | Ueda | 177/25.18 |
| 4,601,414 | 7/1986 | Lawson | 222/564 |
| 4,602,709 | 7/1986 | Ueda | 177/25.18 X |
| 4,614,262 | 9/1986 | Konishi | 177/25.18 X |
| 4,693,355 | 9/1987 | Bochi et al. | 193/2 R |
| 4,792,031 | 12/1988 | Warner et al. | 193/2 R |
| 4,844,190 | 7/1989 | Mikami et al. | 177/25.18 |
| 4,854,722 | 8/1989 | Jackson | 222/564 X |
| 4,889,202 | 12/1989 | Bron | 177/134 |
| 5,109,970 | 5/1992 | Zaborszki | 193/2 R |
| 5,248,197 | 9/1993 | Storf et al. | 222/564 X |
| 5,258,580 | 11/1993 | Bergholt | 177/25.18 |

FOREIGN PATENT DOCUMENTS

| | | |
|---|---|---|
| 0101313 | 8/1983 | European Pat. Off. . |
| 0141670 | 11/1984 | European Pat. Off. . |

Primary Examiner—Michael L. Gellner
Assistant Examiner—Randy W. Gibson
Attorney, Agent, or Firm—Keiichi Nishimura

[57] ABSTRACT

A combinational weighing machine has not only a plurality of weighing devices for weighing articles and outputting signals indicative of their weight values and a control system for calculating combinations of the weight values, selecting a combination of weighing devices according to a given criterion and causing articles to be discharged from the selected combination of weighing devices, but also a discharge chute for receiving the discharged articles and leading them to a discharge opening and a guide member disposed inside the discharge chute with a sloped outer surface serving to deflect the articles colliding therewith into a vertically downward direction.

17 Claims, 5 Drawing Sheets

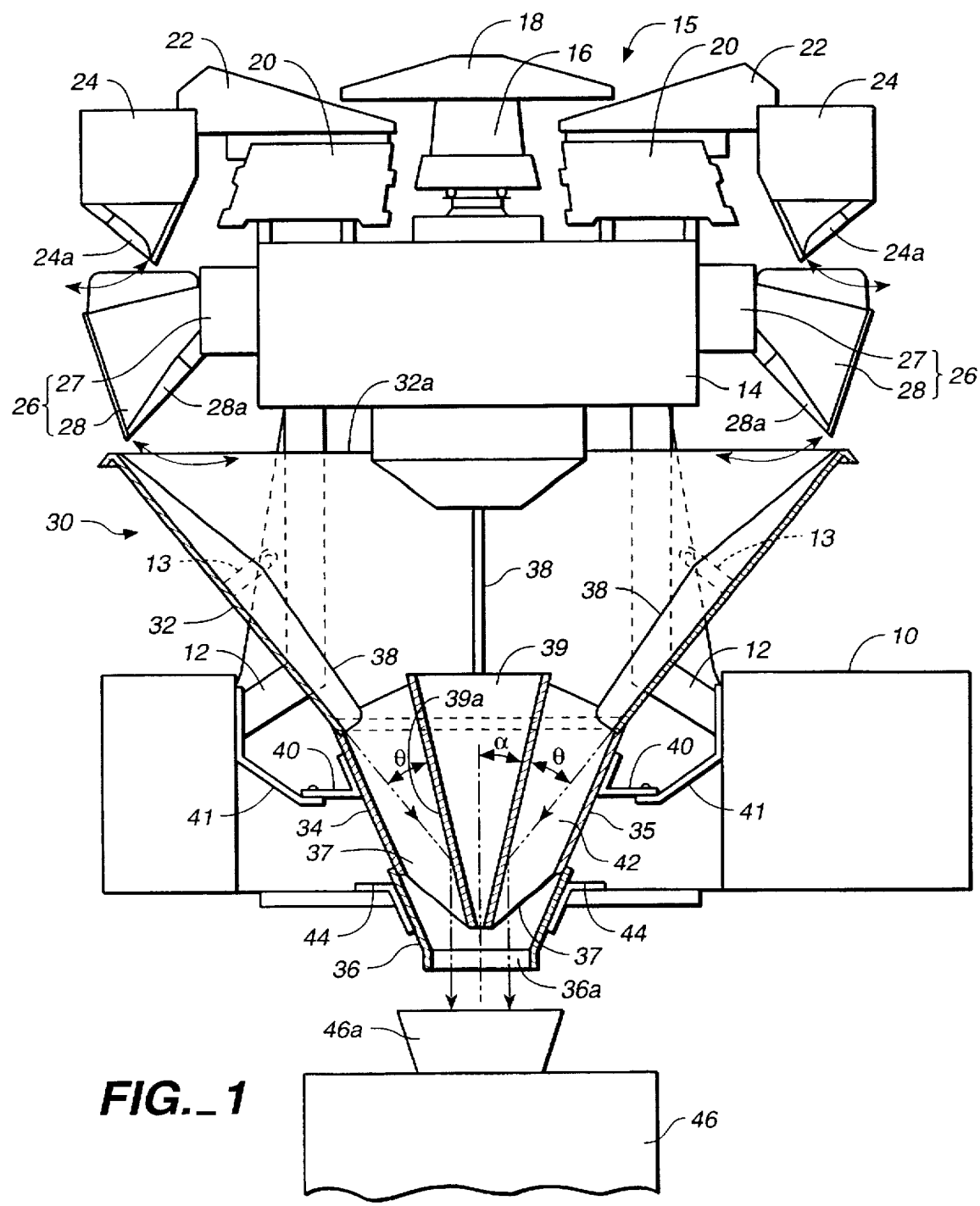
FIG._1

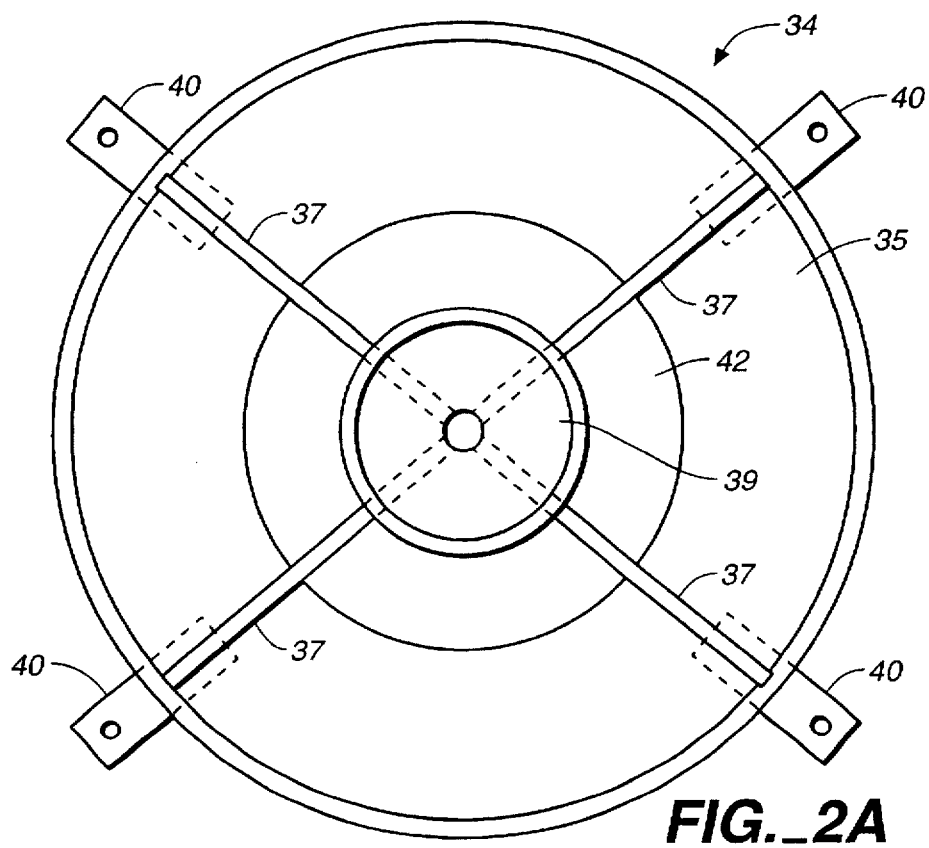
FIG._2A
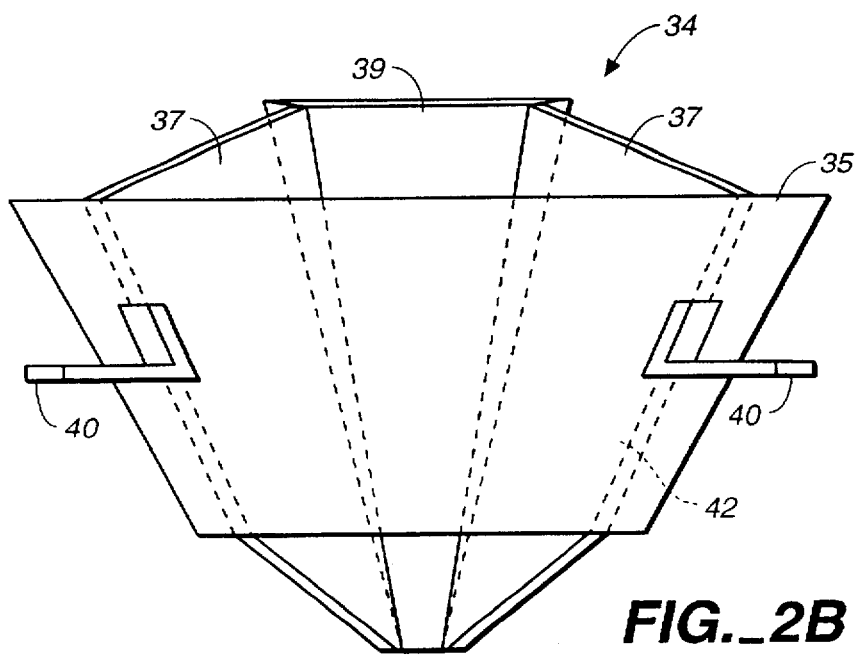
FIG._2B

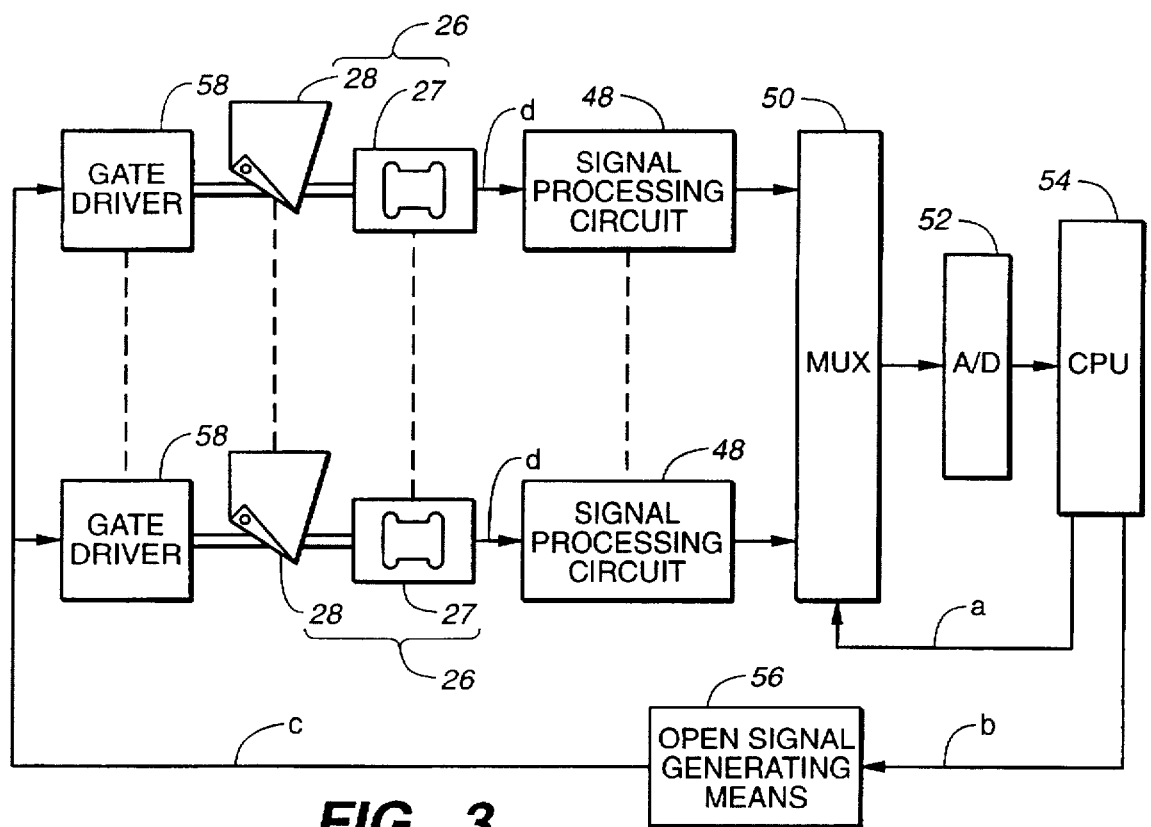
FIG._3
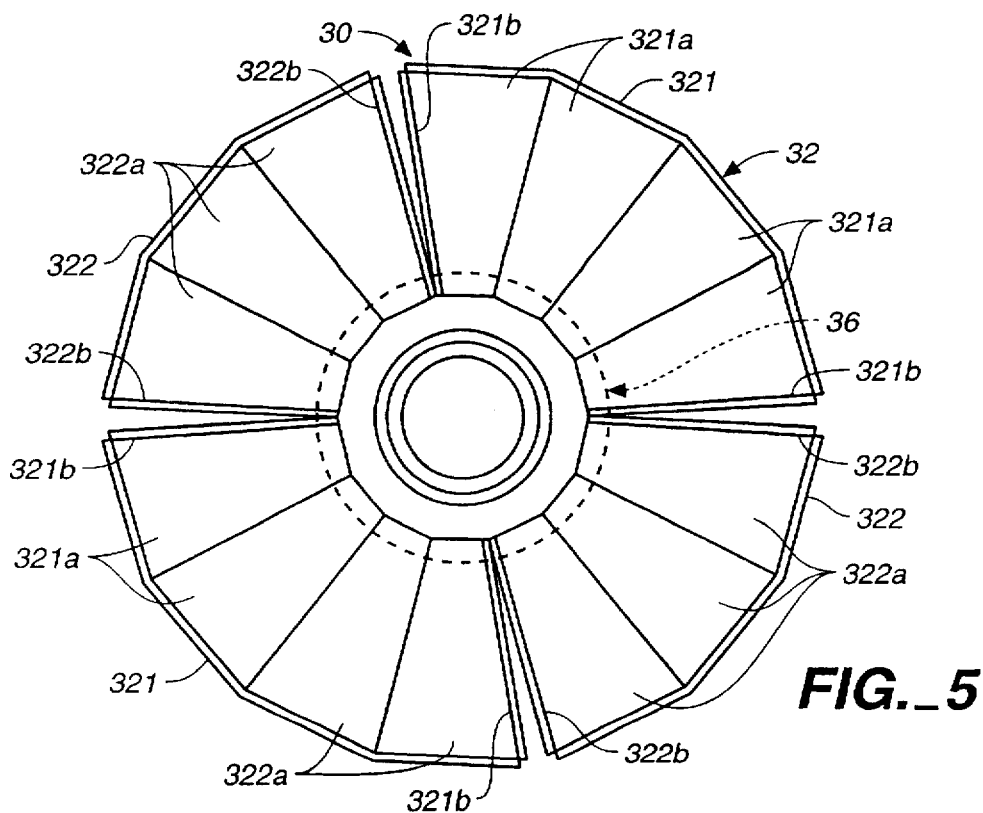
FIG._5

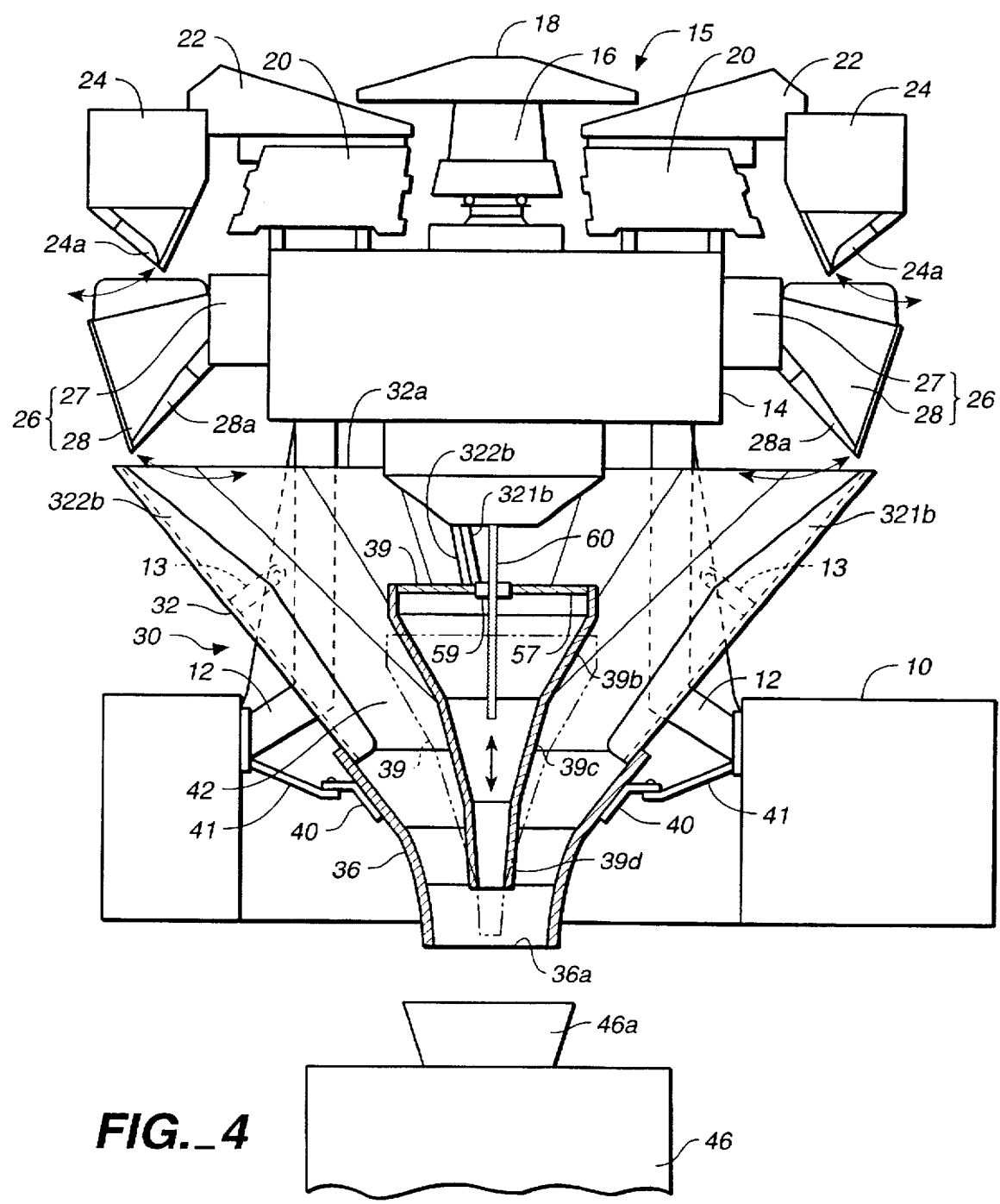
FIG._4

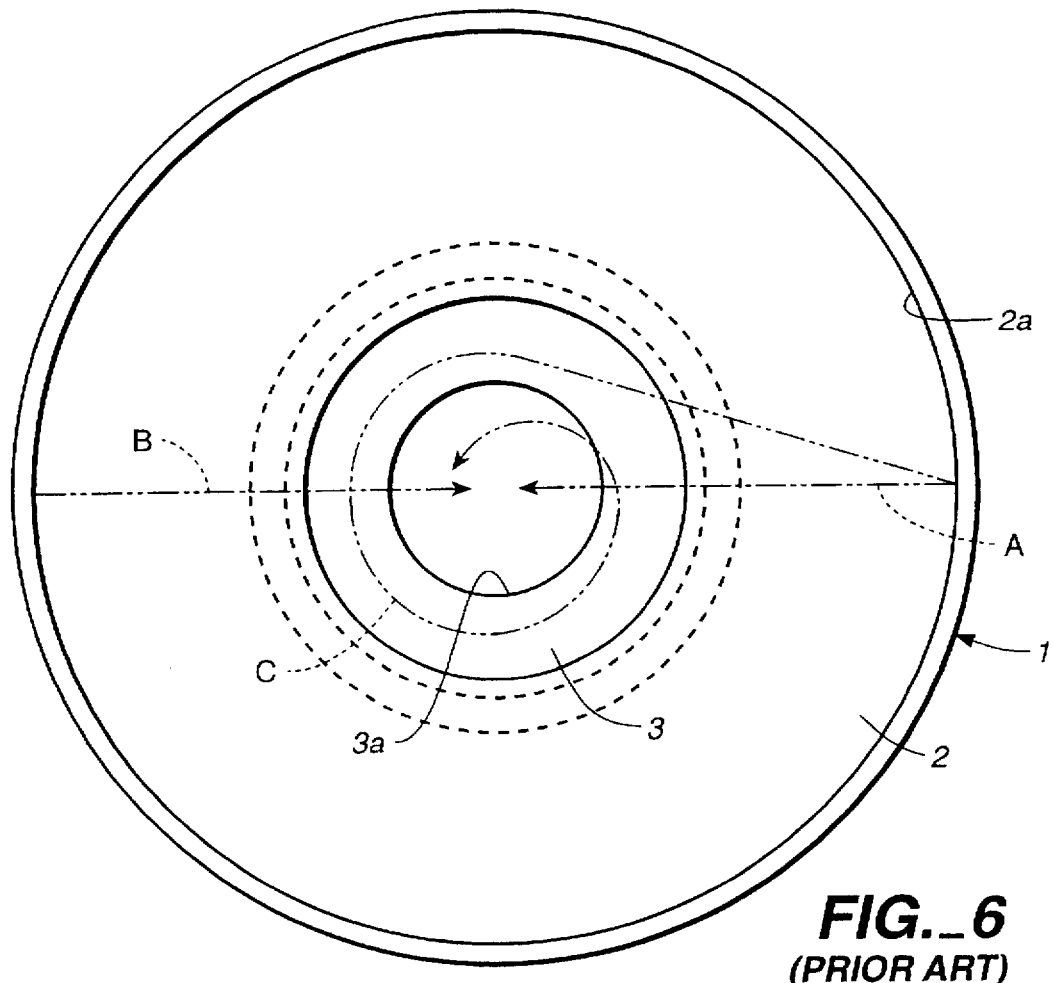
FIG._6
(PRIOR ART)
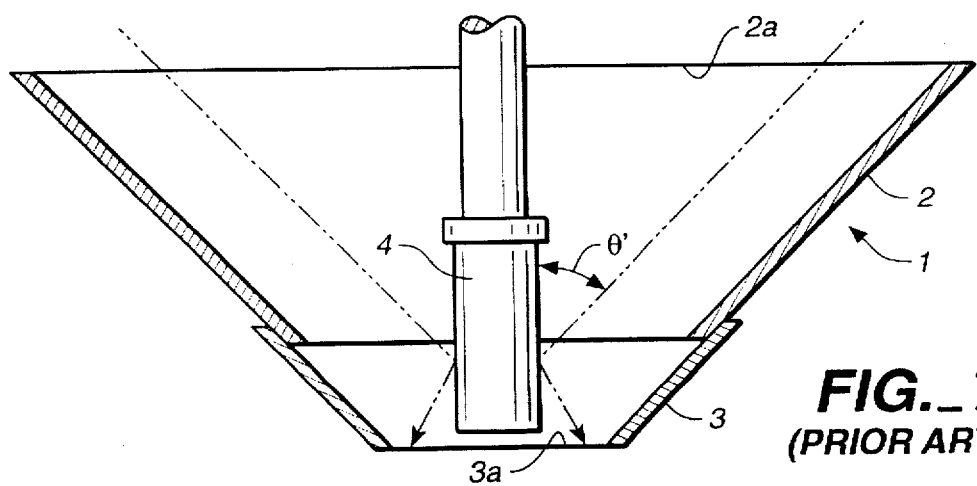
FIG._7
(PRIOR ART)

COMBINATIONAL WEIGHING MACHINE WITH A DISCHARGE CHUTE HAVING ARTICLE GUIDING SURFACE

BACKGROUND OF THE INVENTION

This invention relates to a combinational weighing machine for weighing articles with a plurality of weighing devices, combining the measured weight values outputted from the weighing devices to select a combination having a total weight value within an allowable range, and collecting articles discharged from those of the weighing devices corresponding to the selected combination.

It has been known to use a combinational weighing machine of this kind by supplying articles to weigh hoppers through respective pool hoppers, using load cells to measure the weight of articles in each weigh hopper, causing a microcomputer to calculate the combinations of the weight values received from the load cells, comparing the results of the calculation with a target weight value and selecting a particular combination with the total weight that is the closest to the target weight value within a certain limitation. Many combinational weighing machines used for automatically packaging food items such as potato chips and wrapped candy have a plurality of (say, 14) weighing devices arranged in a circle with a discharge chute (or collection chute) 1, as shown in FIG. 6, disposed below the weighing devices. Such a discharge chute 1 is typically conical in shape, having an upper hopper 2 and a lower chute 3. The upper hopper 2 has an article receiving opening 2a with a large diameter at the top and its lower edge connected to the upper opening of the lower chute 3 which is also conically shaped and has a discharge opening 3a of a smaller diameter at the bottom. Thus, articles, which have been discharged from weighing devices belonging to a combination selected by a combinational calculation, slide down the conically shaped inner surface of the discharge chute 1 towards the discharge opening 3a at the bottom, are discharged through the discharge opening 3a with small diameter and are collected, say, in a bag being formed by a bag maker-packaging machine disposed below the weighing machine. Weighing and packaging, as described above, must be carried out as speedily as possible (say, at a rate of about 90 cycles/minute) for economical reasons. In this regard, there would be no problem if the articles discharged into the discharge chute 1 would slide down on straight trajectories towards the discharge opening as shown by arrows A and B indicated in FIG. 6. If articles are discharged into the discharge chute 1 from a weighing device of which the neighboring weighing devices were not selected in the combination and hence are not discharging articles therefrom, for example, the articles discharged from such an "isolated" weighing device tend to spread sideways as they slide down the inner surface of the discharge chute 1 because there are no other articles simultaneously sliding down in the neighboring downward paths.

Thus, some of them may spiral down on an elongated path towards the discharge opening 3a, as shown by arrow C. Since some of the articles will take the shortest route and quickly arrive at the discharge opening 3a, the articles, although discharged from the same weighing device at the same time, will be forming a relatively long line when being discharged from the discharge opening 3a, taking a relatively long time to be completely discharged.

If a relatively long time is required to discharge all articles dropped into the discharge chute at the same time, the timing for sealing the bag into which these articles have been dropped, as well as the timing for opening the weigh hopper for the next cycle of operation, will be delayed accordingly. This affects the efficiency of the weighing machine adversely.

If two weighing devices which are diametrically opposite to each other with respect to the discharge chute are selected in a combinational calculation, the articles dropped therefrom will slide down generally towards each other, as indicated by arrows A and B in FIG. 6. Head-on collisions are likely to take place, causing the articles to break or crack and thereby affecting the commercial value of the products adversely.

In view of the situation described above, Japanese Utility Model Publication 5-37226 disclosed a discharge chute 1 provided, as shown in FIG. 7, with a cylindrical buffer 4 at the center of the discharge opening 3a in order to prevent head-on collisions of the articles. Such a device will be able to prevent direct collisions between articles dropped from mutually opposite weighing devices, but it will have no effect in preventing articles from spiraling down the surface of the discharge chute 1. Moreover, since the sliding articles will collide with the buffer 4 at a relatively large angle θ, as shown in FIG. 7, they do not bounce from the buffer 4 into a vertical direction straight towards the discharge opening 3a. In other words, such a buffer does not make it possible to collect discharged articles efficiently and hence cannot significantly improve the efficiency of the weighing machine.

It has also been attempted to design the lower chute 3 such that its inner surface will have a parabolic cross-sectional shape. This will have the effect of causing the articles to naturally accelerate towards the discharge opening 3a by the force of gravity, and the articles are likely to all arrive at the discharge opening 3a at the time. This will reduce the probability of collisions between articles, but the height of the weighing machine will increase because the articles are cause to drop vertically downward towards the discharge opening by the force of gravity alone.

SUMMARY OF THE INVENTION

It is therefore an object of this invention to provide a combinational weighing machine capable of quickly leading all articles dropped into its chute towards its discharge opening and preventing collisions among them.

A combinational weighing machine embodying this invention, with which the above and other objects can be accomplished, may be characterized as comprising not only a plurality of weighing devices for weighing articles and outputting signals indicative of the weight values of the weighed articles and a control system for calculating combinations of the weight values, selecting a combination of weighing devices according to a given criterion and causing articles to be discharged from the selected combination of weighing devices, but also a discharge chute for receiving the discharged articles and leading them to a discharge opening and a guide member disposed inside the discharge chute with its outer surface serving to deflect the articles colliding therewith into a vertically downward direction. For combinational weighing machines with weighing devices arranged in a circle, buffers may be provided to partition in the circumferential direction the passageway for discharged articles between the guide member and the discharge chute.

After a combinational weighing machine according to this invention measures the weights of articles supplied to its individual weighing devices, its control system calculates combinations of the measured weights, selects a combination satisfying a certain criterion and causes articles to be discharged from the selected weighing devices into the discharge chute. The discharged articles slide down over the sloped inner surface of the discharge chute, collide with the guide surface of the guide member and are deflected thereby into the vertically downward direction towards the discharge opening.

If buffers are provided according to this invention to a combinational weighing machine with circularly disposed weighing devices, articles are prevented from spiraling down on the inner surface of the discharge chute even if they were discharged from a weighing device of which the neighboring weighing devices were not selected and not discharging their articles. Instead, the discharged articles slide down approximately radially and collide with the guide member at a specified angle so as to be deflected into a vertically downward direction.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic sectional side view of a part of a combinational weighing machine embodying this invention;

FIGS. 2A and 2B are respectively a plan view and a horizontal view of the middle chute of the weighing machine of FIG. 1;

FIG. 3 is a block diagram of the signal processing system of the weighing machine of FIG. 1;

FIG. 4 is a schematic sectional side view of a part of another combinational weighing machine embodying this invention;

FIG. 5 is a plan view of the discharge chute of the combinational weighing machine of FIG. 4;

FIG. 6 is a plan view of a prior discharge chute; and

FIG. 7 is a sectional side view of another prior art discharge chute.

DETAILED DESCRIPTION OF THE INVENTION

In what follows, the invention is described more in detail by way of examples with reference to drawings.

A combinational weighing machine embodying this invention, as illustrated in FIG. 1, has its article supply part 15 disposed on a casing 14 which is supported by a plurality of legs 12 on a main frame 10. The article supply part 15 includes a dispersion feeder 18 having a flat conical shape and provided with a vibrator 16 disposed at the center of a table (not shown) on the casing 14, a plurality of supply feeders 22 distributed radially around and below the dispersion feeder 18 and each provided with a vibrator 20, and pool hoppers 24 individually associated with the supply feeders 22 and disposed in a circle below article discharging (radially outward) ends of the individual supply feeders 22.

Supported on the outer circumference of the casing 14, there are a plurality of weighing devices 26, each including a weighing unit 27 such as a load cell and a weigh hopper 28 supported by the weighing unit 27, disposed in a circle individually corresponding to the pool hoppers 24. Each pool hopper 24 and weigh hopper 28 is provided with a gate (respectively shown at 24a and 28a), adapted to open and close as shown by double-headed arrows. Gate-operating mechanisms and motors for the pool hoppers 24 and the weigh hoppers 28 are enclosed inside the casing 14.

A conically tubular discharge chute (or collection chute) 30 is disposed below the weigh hoppers 28, composed essentially of an upper chute 32, a middle chute 34 and a lower chute 36, which are each conically tubular and connected together sequentially from above. The upper chute 32 is positioned such that its article-receiving top opening 32a is capable of receiving articles discharged from the weigh hoppers 28 and is supported by the legs 12 through connecting members 13. Four partition boards 38 are attached to the inner surface of the upper chute 32, separated from each other circumferentially.

As shown more in detail in FIGS. 2A and 2B, the middle chute 34 includes a conically tubular main body 35, four buffers 37 and a conically tubular guide member 39. This guide member 39 is disposed so as to penetrate the main body 35 through its center. The four buffers 37 are disposed radially between the main body 35 and the guide member 39, their two contact surfaces connected to the inner surface of the main body 35 and the outer surface of the guide member 39, thereby circumferentially dividing the annular passageway 42 created between the main body 35 and the guide member 39 into four sections. The buffers 37 also serve as supporting means through which the guide member 39 is supported by the main body 35. The middle chute 34 is arranged such that its upper opening is adjacent to the lower opening of the upper chute 32 and its four buffers 37 match the partition boards 38 shown in FIG. 1, supported by the frame 10 through brackets 40 and 41.

The lower chute 36 is supported by the frame 10 through brackets 44 such that its upper opening is adjacent to the bottom part of the guide member 39 and the buffers 37. The bottom part of the lower chute 36 forms a discharge opening 36a with a small diameter through which weighed articles are discharged together. A packaging machine 46 is disposed below the discharge opening 36a such that the weighed articles discharged through the discharge opening 36a are received in a bag (not shown) through an article-receiving opening 46a of the packaging machine 46.

Steps in the operation of the weighing machine are described next.

Articles to be weighed are transported by a conveyor (not shown), placed on the dispersion feeder 18 through a supply chute (not shown) and dispersed and distributed into the pool hoppers 24 by the vibrations of the dispersion feeder 18 and the supply feeders 22. After being temporarily stored in the pool hoppers 24, they are discharged therefrom as the gates 24a are opened and received by the associated weigh hoppers 28. The weight of the batch of articles in each weigh hopper 28 is measured by the associated weighing unit 27. Signals indicative of the weight values obtained by the weighing units 27 are processed as described below.

As shown in FIG. 3, the over-all operation of the weighing machine is controlled by a central processing unit (CPU) 54. When the weights of article batches are measured by the weighing units 27, a switch signal "a" is outputted to a multiplexer (MUX) 50. In response, the multiplexer 50 causes the weighing units 27 to output, in a specified sequence, their weight signals "d" indicative of the measured weights of the article batches. The weight signals "d" outputted from the individual weighing units 27 are amplified by the corresponding signal processing circuits 48, each including an amplifier and a filter, converted into digital signals by a analog-to-digital converter (A/D) 52 and inputted to the central processing unit 54.

The central processing unit 54 carries out combinational calculations, based on the weight signals thus received, selects a combination on the basis of the combinational calculations and a certain criterion (such as the combination with a total weight which is close to a predetermined target weight value and within an allowable range), and outputs a selection signal "b" indicative of the selected combination. When the selection signal "b" is received by an open signal generating means 56, an open signal "c" for controlling the motion of gate drivers 58 of the weighing devices 26 is thereby generated, causing the gates 28a of only those of the weigh hoppers 28 selected in the combination are opened to discharge the articles therefrom into the discharge chute 30. New batches of articles are thereafter supplied into these weigh hoppers 28, which have just discharged their contents, from the corresponding ones of the pool hoppers 24 for the next cycle of combinational calculations.

The articles discharged from the weigh hoppers 28 are adapted to mostly land somewhere near the article-receiving top opening 32a of the upper chute 32. Thereafter, these articles slide down over the inner surface of the upper chute 32, are thrown into the middle chute 34 in a diagonally downward direction, and collide with the guide member 39, as shown in FIG. 1, by making an angle θ with its guide surface 39a, or its outer circumferential surface. The angle α of the conical shape of the guide member 39 (as shown in FIG. 1) is so selected that articles colliding therewith at the angle of θ, as explained above, will be deflected into a vertically downward direction (as shown by downward arrows in FIG. 1). In other words, the horizontal component of the motion of the articles generated as they slide down inside the upper chute 32 is eliminated by their collision with the guide surface 39a, and the articles are forcibly deflected so as to drop naturally downward towards the discharge opening 36a. Thus, the articles can be collected at the discharge opening 36a quickly and efficiently.

If one of the weighing devices 26 selected by combination calculations of the central processing unit 54 turns out to be isolated from the other selected weighing devices 26, the articles discharged from the weigh hopper 28 of such isolated weighing device 26 tend to move sideways, as explained above, because there are no articles being dropped from the adjoining weighing devices. Some of them may be pushed sideways and start spiraling down into the middle chute 34. Such spiral motion of articles, which might otherwise result in such a situation, can be prevented by the buffers 37 which deflect articles beginning to move sideways and to spiral. Deflected by the buffers 37, the spiraling articles will collide with the guide surface 39a at an angle of θ and thereafter drop vertically downward towards the discharge opening 36a, as described above. In other words, the discharged articles are prevented from forming a long line as they enter the middle chute 34 from the upper chute 32.

As a result, articles discharged in different cycles of the combinational calculations are dependably separated as they are discharged. This makes it possible to reduce the time required for the thermal sealing of bags by the packaging machine 46 and to reduce also the interval between successive discharges of articles from the weighing machine. In other words, since discharged articles are prevented from spiraling down the chute, articles discharged in one cycle of combinational calculations do not mix into the articles discharged in the next cycle, even if the period of cyclic operation of the combinational weighing machine is reduced.

Since the downward deflection of articles is accomplished by the sloped guide surface 39a, the height of the chute need not be increased, as was the case with a chute with a parabolical cross-sectional shape. Since the guide member 39 serves to prevent direct collisions among the articles and since the articles collide with the guide surface 39a (which is stationary and may be of a softer material) at a relatively small angle θ, furthermore, there is a reduced probability of cracks and breakages.

Should jams tend to occur at the discharge opening 36a or in the package-making bags because discharged articles arrive at the discharge opening 36a at the same time according to this invention, the timing of opening the weigh hoppers 28 of selected weighing devices 26 may be slightly modified such that the discharged articles will be discharged in a line of a desired length.

Another combination weighing machine according to a second embodiment of the invention is described next with reference to FIG. 4, wherein components which are equivalent or at least similar to those described above with reference to FIG. 1 are indicated by the same numerals. For convenience, it will be assumed specifically that this combinational weighing machine has fourteen weighing devices, fourteen pool hoppers and fourteen supply feeders, disposed in a circle around a dispersion feeder 18.

This combinational weighing machine is different from the one shown in FIG. 1 wherein the upper chute 32 and the lower chute 36 of its discharge chute 30 are connected together and a guide member 39 is provided separately from the discharge chute 30, disposed at the center of the discharge chute 30, hung from the casing 14 by means of an externally threaded rod 60.

As shown more clearly in FIG. 5, the upper chute 32 is formed with two each of larger units 321 each corresponding to four weighing devices and smaller units 322 each corresponding to three weighing devices, assembled together so as to be approximately in a conical tubular shape as a whole. Each larger unit 321 is formed by bending an approximately fan-shaped sheet of stainless steel so as to have four nearly rectangular trapezoidal slide surfaces 321a, each becoming narrower on one side, and flanges 321b extending from and bent upward along both edges, each of the slide surfaces corresponds to one of the weighing device. Similarly, each smaller unit 322, corresponding to three weighing devices, is formed by bending an approximately fan-shaped sheet of stainless steel so as to have three nearly rectangular trapezoidal slide surfaces 322a, each becoming narrower on one side, and flanges 322b extending from and bent upward along both edges, each of the slide surfaces corresponding to one of the weighing devices. The lower chute 36 is conically tubular, the angle of the cone varying in three stages in the vertical direction, as shown in FIG. 4.

The guide member 39 is approximately of a conically tubular shape with the angle of the conic outer surface varying in three stages to form three guide surfaces 39b, 39c and 39d arranged in the vertical direction such that articles sliding down over the slide surfaces 321a and 322a will be deflected thereby by colliding with the guide member 39 and fall vertically downward. A cross-shaped attachment member 57 is inserted and fastened to the top opening of the guide member 39, and the externally threaded rod 60 engages with a nut 59 affixed to the attachment member 57 at the center such that the vertical position of the guide member 39 relative to the discharge chute 30 can be changed (as shown by double-headed arrow) by rotating either the rod 60 or the guide member 39 itself. The guide member 39 at another position is indicated by a broken line in FIG. 4.

The vertical position of the guide member 39 relative to the discharge chute 30 is adjusted, depending on how the articles are deflected when colliding. It may be adjusted also so as to widen the passage 42 when the total amount of the discharged articles is large, or when the target weight of the combinational calculations is large, and to make it narrower when the target weight is small.

Although no buffers are provided according to this embodiment of the invention, the upwardly bent flanges 321b and 322b serve to prevent motion of articles in circumferential directions, and spiral motion of articles can be prevented just as effectively.

Although the invention has been described above with reference to only a limited number of examples, these examples are not intended to limit the scope of the invention. Many modifications and variations are possible within the scope of the invention. For example, the slope of the conical surface of the guide member or the chute may change continuously such that, for example, the cross-sectional shape of their surface may be a parabola or some other higher-order curve. Any such modifications and variations that may be apparent to a person skilled in the art are intended to be within the scope of the invention.

What is claimed is:

1. A combinational weighing machine comprising:
   a plurality of weighing devices for weighing articles and outputting signals indicative of weight values of articles weighed thereby;
   a control system for calculating combinations of said weight values, selecting a combination of said plurality of weighing devices according to a given criterion and causing articles to be discharged from said selected combination of weighing devices;
   a discharge chute having a discharge opening for receiving said discharged articles and discharging said received articles through said discharge opening; and
   a guide member with a guide surface, said guide member being disposed inside and separate from said discharge chute, said guide surface being sloped so as to cause articles sliding inside said discharge chute and undergoing collisions with said guide surface to be deflected vertically downward by said collisions.

2. The combinational weighing machine of claim 1 wherein said weighing devices are arranged in a circle, and said combinational weighing machine further comprises buffers which serve to prevent said discharged articles from spiraling down said discharge chute towards said discharge opening.

3. A combinational weighing machine comprising:
   a plurality of weighing devices for weighing articles and outputting signals indicative of weight values of articles weighed thereby;
   a control system for calculating combinations of said weight values, selecting a combination of said plurality of weighing devices according to a given criterion and causing articles to be discharged from said selected combination of weighing devices;
   a discharge chute having a discharge opening for receiving said discharged articles and discharging said received articles through said discharge opening, there being a plurality of partition boards attached to an inner surface of said discharge chute;
   a guide member with a guide surface, said guide member being disposed inside said discharge chute, said guide surface being sloped so as to cause articles sliding inside said discharge chute and undergoing collisions with said guide surface to be deflected vertically downward by said collisions, said discharge chute and said guide member forming a passageway therebetween; and
   buffers which match said partition boards for partitioning said passageway.

4. The combinational weighing machine of claim 3 wherein said weighing devices are arranged in a circle, and said buffers partition said passageway in circumferential direction.

5. The combinational weighing machine of claim 4 wherein said buffers serve to prevent articles discharged from said weighing devices from spiraling down said discharge chute towards said discharge opening.

6. The combinational weighing machine of claim 5 wherein said guide member is tubular and said guide surface is conical.

7. A combinational weighing machine comprising:
   a plurality of weighing devices for weighing articles and outputting signals indicative of weight values of articles weighed thereby;
   a control system for calculating combinations of said weight values, selecting a combination of said plurality of weighing devices according to a given criterion and causing articles to be discharged from said selected combination of weighing devices;
   a discharge chute having a discharge opening for receiving said discharged articles and discharging said received articles through said discharge opening; and
   a guide member with a guide surface, said guide member being disposed inside said discharge chute, said guide surface being sloped so as to cause articles sliding inside said discharge chute and undergoing collisions with said guide surface to be deflected vertically downward by said collisions, position of said guide member being adjustable relative to said discharge chute.

8. The combinational weighing machine of claim 2 wherein said guide member is tubular and said guide surface is conical.

9. The combinational weighing machine of claim 8 wherein the slope of said conical guide surface changes.

10. The combinational weighing machine of claim 7 further comprising an externally threaded rod attached to said guide member and a nut which is engageable with said rod for adjusting the vertical position of said guide member relative to said discharge chute.

11. The combinational weighing machine of claim 6 wherein the slope of said conical guide surface changes.

12. The combinational weighing machine of claim 7 wherein said weighing devices are arranged in a circle, and said combinational weighing machine further comprises buffers which serve to prevent said discharged articles from spiraling down said discharge chute towards said discharge opening.

13. The combinational weighing machine of claim 12 wherein said guide member is tubular and said guide surface is conical.

14. The combinational weighing machine of claim 13 wherein the slope of said conical guide surface changes.

15. The combinational weighing machine of claim 10 wherein said weighing devices are arranged in a circle, and said combinational weighing machine further comprises buffers which serve to prevent said discharged articles from spiraling down said discharge chute towards said discharge opening.

16. The combinational weighing machine of claim 15 wherein said guide member is tubular and said guide surface is conical.

17. The combinational weighing machine of claim 16 wherein the slope of said conical guide surface changes.

* * * * *